United States Patent [19]

Koo et al.

[11] Patent Number: 4,992,485

[45] Date of Patent: Feb. 12, 1991

[54] MICROPOROUS PEEK MEMBRANES AND THE PREPARATION THEREOF

[75] Inventors: Ja-Young Koo, Plymouth, Minn.; Chieh-Chun Chau, Midland, Mich.; Joel R. Racchini, St. Louis Park, Minn.; Ritchie A. Wessling, Berkeley, Calif.; Matthew T. Bishop, Midland, Mich.

[73] Assignees: The Dow Chemical Company, Midland, Mich.; Filmtec Corporation, Minneapolis, Minn.

[21] Appl. No.: 255,220

[22] Filed: Oct. 11, 1988

[51] Int. Cl.$^5$ .............................................. C08H 9/28
[52] U.S. Cl. ...................................... 521/180; 521/61; 521/79; 428/159; 528/125; 528/126; 528/128
[58] Field of Search ....................... 528/126, 128, 125; 521/64, 79, 180; 524/157, 417, 165; 264/209.1, 209.2, 45.9, 46.1; 428/158, 315.5, 315.7, 318.6, 319.7, 308.4; 210/500.21, 500.23, 500.27, 500.33

[56] References Cited

U.S. PATENT DOCUMENTS

| 3,928,295 | 12/1975 | Rose . | |
| 4,320,224 | 3/1982 | Rose et al. | 528/125 |
| 4,419,486 | 12/1983 | Rose | 525/535 |
| 4,714,725 | 12/1987 | Hendy et al. | 524/108 |
| 4,721,732 | 1/1988 | Dubrow et al. | 521/62 |

FOREIGN PATENT DOCUMENTS

| 202082 | 6/1985 | European Pat. Off. . |
| 225750 | 12/1985 | European Pat. Off. . |
| 0254341 | 1/1988 | European Pat. Off. . |
| 3321860 | 6/1983 | Fed. Rep. of Germany . |
| 3402471 | 8/1985 | Fed. Rep. of Germany . |
| 57-191322 | 5/1981 | Japan . |
| 58-063417 | 10/1981 | Japan . |
| 62-095104 | 5/1987 | Japan . |
| 63-020339A | 1/1988 | Japan . |

2180790 4/1987 United Kingdom .

OTHER PUBLICATIONS

M. T. Bishop et al., "Solubility and Properties of a Poly(aryl ether ketone) in Strong Acids"; *Macromolecules,* 1985, ACS, vol. 18, pp. 86–93.

X. Jin et al., "A Sulphonated Poly(arylEtherKetone)"; *British Polymer Journal,* vol. 17, No. 4(1985).

T. E. Attwood, et al., "Synthesis and Properties of Polyaryletherketones", *Polymer Preprints,* vol. 20, No. 1, pp. 191–194 (Apr., 1979).

C. Kamizawa, M. Matsuda, and R. Kobayashi, "Preparation of Two Types of Ultrafiltration Membranes Using Organic Solvents as the Gelating Solutions", Proceeding of the International Congress on Membrane and Membrane Processes at Tokyo, Japan (1987).

Dr. Klaus Dahl (Raychem Corporation), "Heat Resistant Semicrystalline Poly(phenylene ether ketones) Melt Processable High Performance Polymers", 36th Industrial Affiliates Symposium on High Performance Polymers, Departments of Chemistry and Chemical Engineering, Stanford University, Dec. 3–5, 1986.

*Primary Examiner*—Veronica P. Hoke
*Attorney, Agent, or Firm*—Thomas A. Ladd

[57] ABSTRACT

A microporous polyetheretherketone (PEEK) membrane in the form of films and hollow fibers formed without sulfonating the PEEK polymer. Solid fibers and articles are also claimed. A method of making membranes, fibers and articles from solutions of PEEK in non-sulfonating acid solvents in claimed. Solvents include methane sulfonic acid and trifluoromethane sulfonic acid. Sulfuric acid may be used as a diluent in non-sulfonating amounts. PEEK membranes are used as supports for composite ultrafiltration and reverse osmosis membranes. A method of making membranes, fibers, and articles is also described.

32 Claims, 3 Drawing Sheets

MICROPOROUS PEEK MEMBRANES AND THE PREPARATION THEREOF

BACKGROUND OF THE INVENTION

Microporous polymer membranes are staple products in the art of separations of fluid fractions.

Poly(oxy-1,4-phenyleneoxy-1,4-phenylene-carbonyl-1,4-phenylene), more commonly known as poly(etheretherketone), or PEEK, displays advantageous chemical and physical properties for many uses. The high melting point (about 367° C.), high glass transition temperature (about 145° C.), low solubility and high chemical resistance make PEEK a material of choice for separations applications for harsh environments.

PEEK is not known to be affected by common organic solvents at room temperature. PEEK is also resistant to acids and bases with the exception of strong acids in high concentrations. The general insolubility of PEEK, while a useful and advantageous property of a membrane in place, complicates the formation of useful articles including microporous membranes from PEEK.

Polymer film useful as ultrafiltration membranes and reverse osmosis membrane supports are traditionally formed by dissolving the polymer in a solvent, casting the polymer solution on a support as a thin film, followed by coagulation of the polymer by immersion of the support and polymer film into a bath of liquid in which the polymer solvent is miscible, but which is not a solvent for the polymer.

PEEK solubility has been reported in concentrated sulfuric acid (German Patent No. 3,321,860). Membranes have been cast from PEEK and dissolved in concentrated $H_2SO_4$. However, the membranes formed are no longer PEEK, but rather have been sulfonated. As a consequence of the change of chemical composition, the membranes no longer display the advantageous properties of PEEK, and are known to swell upon prolonged exposure to water. Bishop, M. T. et al., *Macromolecules*, 1985, 18, 86.

SUMMARY OF THE INVENTION

We have now found that articles of PEEK, including membranes, may be prepared from PEEK dissolved in a non-sulfonating acid or a non-sulfonating mixture of acids. A semi-permeable membrane suitable as an asymmetrical ultrafiltration (UF) membrane and as a support for a reverse osmosis (RO) membrane can now be prepared from a PEEK-type polymer. Microporous membranes in sheet form and in the form of hollow fibers may be prepared according to the method of the invention by casting films of PEEK-type polymer dissolved in non-sulfonating acids. Hollow fiber membranes may be formed according to the invention by spinning fibers from a PEEK-type polymer dissolved in a non-sulfonating acid. Enhanced flux PEEK membranes may be prepared from a PEEK-type polymer dissolved in non-sulfonating acids in the presence of small amounts of halogenated hydrocarbons.

DETAILED DESCRIPTION OF THE INVENTION

An objective of this invention is to provide for the preparation of useful articles from PEEK including porous solid fibers, membrane film, and hollow membrane fibers. The preparation of more durable membranes for ultrafiltration and microfiltration from PEEK is a further object of this invention. A further object of this invention is the preparation of membrane substrates from PEEK for reverse osmosis membranes.

A feature of the invention is the optional use of a halogenated hydrocarbon solvent of 3 or less carbon atoms in the non-sulfonating acid solvent for PEEK.

The incorporation of a sufficient amount of a halogenated hydrocarbon solvent of 3 or less carbon atoms in the non-sulfonating acid solvent for PEEK results in an advantage from the invention of an enhanced level of fluid flux over PEEK membranes prepared without the presence of a halogenated hydrocarbon solvent of 3 or less carbon atoms in the non-sulfonating acid solvent for PEEK.

A further advantage which results from the optional use of a halogenated hydrocarbon solvent of 3 or less carbon atoms in the non-sulfonating acid solvent for PEEK is that the enhanced flux rate does not occur at the expense of membrane selectivity.

A further feature of the invention is the control of membrane surface properties by variation of the coagulation fluid for the membranes formed from PEEK dissolved in a non-sulfonating acid.

Advantages of the use of various coagulation fluids for the preparation of PEEK membranes according to the present invention include the opportunity to influence membrane structure afforded to the practitioner of this invention including the formation of a skin on one or both membrane surfaces, and the formation of an elongated honeycomb porous structure between the surfaces of the membrane.

The porous structure between membrane surfaces has advantages by providing structural support to the membrane surface making microporous hollow fiber of PEEK-type polymer particularly suited for application as a support for high pressure uses such as a support for a composite membrane for reverse osmosis applications. A further advantage of the porous structure of the PEEK membranes is the formation of numerous flow channels between the membrane surfaces which permits unencumbered flow of the permeating fluid after the permeate passes through a skin layer or a composite membrane formed on a membrane surface.

Articles and microporous membranes of the present invention are conveniently formed from a solid particulate form of a PEEK-type polymer, such as e.g., a powder, crumbs, pellets, or other convenient or available PEEK subdivided form. The term PEEK, or a PEEK-type polymer, includes polymers which may be prepared by a condensation polymerization reaction involving as the starting material 4,4'difluorobenzophenone, and hydroquinone to which is added anhydrous potassium carbonate in a nitrogen atmosphere at temperatures up to 320° C. Detailed instructions appear in U.S. Pat. No. 4,320,224 to Rose et al. which are incorporated herein by reference.

PEEK-type polymer used for the examples of the instant invention was secured from ICI Americas, Inc. The molecular weight provided by the manufacturer for grade 150G was 7,000, for grade 380G was 13,000, and for grade 450P was 18,000. A weight-average molecular weight determination is made from measurements of intrinsic viscosities of samples dissolved in sulfuric acid using a Mark-Houwink relation ($K=0.000745$, $a=0.65$) established from the data in Bishop, M. T. et al.; (Supra), and including a correction to account for the changes in molecular weights resulting from sulfonaton of the PEEK samples in sulfuric acid. A weight-average molecular weight for a sample of grade 150G PEEK is 20,700; for grade 380G is 32,200 and for grade 450P is 39,200. Reference herein to molecular weight relates to the average molecular weights provided by the manufacturer.

Microporous membranes are prepared from solid PEEK dissolved in a strong but non-sulfonating acid. The term non-sulfonating acid as used herein refers to acids and mixtures of acids which dissolve PEEK in an amount of not less than about five percent by weight but which do not react with the PEEK and change the chemical structure of the PEEK. Non-sulfonating acids include methane sulfonic acid (MSA), trichloromethane sulfonic acid, hydrofluoric acid, phosphoric acid, and trifluromethane sulfonic acid (TFMSA).

Sulfuric acid ($H_2SO_4$) may be effectively used as a diluent for a non-sulfonating acid, provided the proportion of sulfuric acid is limited so as not to increase the viscosity of the solution of PEEK so as to impair the flow of the solution of PEEK in the membrane casting step, or result in sulfonating the PEEK. More than 60 percent $H_2SO_4$ in MSA at room temperature when used as a solvent for PEEK causes sulfonation of the PEEK. $H_2SO_4$ alone is not a suitable solvent to form PEEK membranes as will be shown in the examples following.

In order to form uniform membranes according to this invention, the PEEK must be substantially uniformly dissolved in the acid or a mixture of acids.

Solutions of PEEK suitable for forming microporous membranes of this invention will be present in the casting solution in a range of from about 5 to about 40 percent by weight, preferably in a range from about 8 to about 20 percent by weight.

The step of dissolving PEEK to form the membrane casting solution may be carried out readily at a temperature of from room temperature to about 40° C. Temperatures in excess of 40° C. may be useful to reduce the time necessary to prepare a substantially uniform PEEK solution; however, temperatures should not be elevated so as to cause degradation or sulfonation of PEEK by the acid solvent. Temperatures lower than room temperature may be found advantageous to obtain particular membrane properties. Temperatures from 15° to 30° C. are generally preferred for casting PEEK membranes in the method of this invention.

The forms of PEEK polymer useful in the preparation of the membrane compositions include polymers with molecular weights from 7,000 to 100,000. The size and shape of subdivided solid PEEK polymer, crumbs, particles, or bead size may be varied, but is practically limited by the surface area available to the acid solvent for ease of dissolving and mixing.

The casting of PEEK articles or membrane films is achieved in the traditional method of membrane manufacture, i.e., by pouring a solution of PEEK into a mold of the article or, in the case of thin films, by spreading a solution of PEEK on an impervious surface. Uniform thickness of the resulting membrane is achieved by customary methods such as drawing a casting bar, glass rod or knife across a cast solution of PEEK deposited on a support medium. The casting solution of PEEK is permitted to remain on the support which may range from the minimum time necessary to complete the casting step to minutes before the cast PEEK solution is coagulated in a fluid bath.

In one preferred embodiment of the invention, the PEEK solution may be cast on a fibrous reinforcing medium to provide rigidity and strength such as a non-woven glass fiber mat or a non-woven polyester mat laid upon an impervious surface such as a glass plate. Alternatively, the PEEK membrane film may be cast without reinforcement on an impervious support surface such as a glass plate. After coagulation of PEEK in the coagulation bath, the PEEK membrane may be removed from the glass plate for further preparation or use.

The coagulation bath is a solution in which the acid or mixture of acids is miscible, but which is not a solvent for PEEK. Water is a suitable coagulation fluid for both MSA and TFMSA. In the manufacture of an article from PEEK, the solution of PEEK cast in the shape of the article is contacted with a coagulation fluid, for example by immersion. A coagulation bath causes coagulation of the dissolved PEEK by diluting the non-sulfonating acid solvent for PEEK. Shaped articles cast from PEEK dissolved in non-sulfonating acids generally maintain their integrity and form when immersed in a coagulation bath. Membranes cast from PEEK dissolved in non-sulfonating acids maintain their integrity as membranes when gently immersed in a coagulation bath.

Membranes of PEEK demonstrate sufficient structural integrity after coagulation to be carefully handled. After casting and coagulating a PEEK membrane, the membrane is generally washed in water to remove residual acid solvent for approximately 30 to 60 minutes. Prior to use, membranes may optionally be further washed with dilute basic solutions to promote removal of the non-sulfonating acids.

Solutions of PEEK described herein may also be formed into solid fibers and into hollow fibers by what is described as an air gap wet spinning process in *Encyclopedia of Polymer Science and Technology*, 2d, "Fibers, Manufacture" Mark, H. F. et al., ed Wiley-Interscience, New York, 1986 and as also described in *Encyclopedia of Chemical Technology*, 3d, "Hollow Fiber Membranes", Mark, H. F., et al., ed Wiley-Interscience, New York, 1980. Preparation of PEEK solid or hollow fibers from solutions of PEEK is complicated by the fact that the room temperature solubility of PEEK in MSA is limited to about 8 percent on a weight-to-weight basis. This limited concentration results in a viscosity which approaches the lower limit for practical extrusion of polymer fibers, sometimes called "spinning" of a polymeric material. A feature of the present invention is the discovery that the solubility limit of PEEK in MSA may be increased by the addition of other non-sulfonating acids to form a solvent mixture for PEEK. The substitution of from 0 percent to 100 percent TFMSA for MSA increases the solubility of PEEK to as high as about 40 percent by weight at room temperature. A mixture of 90 percent MSA/-10 percent TFMSA is a convenient solvent for PEEK.

PEEK fibers may be conveniently extruded from a PEEK solution in a non-sulfonating acid solvent in a concentration from 8 percent to 40 percent, preferably in a range from 16 percent to 10 percent.

A further feature of the present invention is the further discovery that the viscosity of the PEEK solution may be increased by the incorporation of $H_2SO_4$ into the non-sulfonating acid solvent for PEEK up to about 60 percent by weight of solvent without the occurrence of adverse sulfonation of the PEEK. The amount of $H_2SO_4$ which may be incorporated as a diluent in the non-sulfonating acid solvent for PEEK is limited by the concentration at which the PEEK begins to be sulfonated by the $H_2SO_4$. The concentration of $H_2SO_4$ at which sulfonation begins will be lower as the temperature increases.

Fibers of PEEK according to the present invention may be prepared from PEEK dissolved in non-sulfonating acids. The solution of dissolved PEEK is extruded into fibers in the usual manner which is well known in the art. Hollow fiber membranes may be prepared by extrusion of the PEEK solution from an annular shaped orifice of an extruder while simultaneously a core fluid is inserted by the extruder in the center of the PEEK solution as it emerges from the annular orifice. The practitioner will empirically modify the core fluid flow rate to a level compatible with the fiber flow rate. The fiber flow rate is also empirically adjusted by the practitioner to produce a uniformly shaped stream prior to immersion in a liquid coagulation bath.

Membrane structure and properties may be varied by variation of the coagulation fluid, polymer molecular weight, or non-sulfonating acid solvent. It has also been found that by using a coagulation bath which has a high relative rate of diffusion of the coagulation liquid into the PEEK polymer phase a microporous skin forms on the exterior surface of the hollow fiber. The rate of diffusion of the coagulation fluid into the PEEK polymer phase containing the non-sulfonating acid PEEK solvent may be slowed by the addition of an acid to the coagulation fluid, such as a coagulation bath of a non-sulfonating level of $H_2SO_4$, for instance 52 percent $H_2SO_4$ in water. Other methods of influencing the rate of diffusion of the coagulation fluid from the diffusion rate of water include the substitution of a polyglycol for water in the coagulation bath at a concentration from greater than zero to 100 percent polyglycol.

It has been observed that coagulation of PEEK polymer in fluids having a high relative rate of diffusion for the non-sulfonating acid solvent for PEEK polymer results in the formation of a thicker skin layer having smaller and fewer pores than does the coagulation of a solution of PEEK polymer in a coagulation fluid having a lower relative rate of diffusion in the PEEK polymer phase. It has also been observed that by coagulating PEEK polymer in coagulation fluids having a higher relative rate of diffusion in the non-sulfonating acid solvent for PEEK polymer, the structure between the surfaces of the membrane is more porous than the structure resulting from coagulation of PEEK polymer solution by a coagulation fluid having a lower relative rate of diffusion. The contrary observation of reduced porosity in the internal membrane structure results from use of coagulation bath fluids having lower relative rates of diffusion into the non-sulfonating acid solvent.

As membrane flux is related to membrane skin thickness, porosity, polymer molecular weight, and pore size, as well as the porosity of the internal membrane structure, optimization of the membrane preparation parameters of non-sulfonation acid solvent, polymer molecular weight, and the relative rate of diffusion of the coagulation fluid will benefit each system in which a membrane separation of fluid fractions is attempted.

The resulting PEEK membrane prepared according to the present invention has what is characterized as a porous asymmetric structure. The PEEK membrane fibers resulting from the hollow fiber extrusion process are described as an interior porous finger-like or ribbed structure between the opposing surfaces of the microporous membrane fibers with fingers or ribs extending generally radially between the outer surface or skin and the lumen of the fiber. The fingers or ribs surround vacuoles formed within the PEEK membrane. This radial structure is advantageous for hollow fiber membrane applications because it provides porous channels for flow between the discriminating microporous membrane skin and the lumen. The fingers or ribs in the asymmetric hollow membrane fiber provide additional structural support for the discriminating skin layer under elevated pressures employed in the use of the hollow fiber PEEK membrane as a reverse osmosis membrane support.

If a core fluid which has a relatively low rate of diffusion for the PEEK solvent is injected into the bore of the hollow fiber membrane, skin formation in the bore may be reduced or altogether avoided.

The physical characteristics of the hollow fiber PEEK membrane may be reversed by reversing characteristics of the bore fluid and the characteristics of the immersion bath. In this manner skin may be formed on the lumen surface by injecting in the bore of the hollow PEEK fiber at the extruder a fluid having a high affinity for the non-sulfonating acid PEEK solvent. If the immersion bath has a fluid which does not have a strong affinity for the non-sulfonating acid or acid mixture which dissolves PEEK, the finger or rib-like structure will result generally radially outward from the skin formed at the bore, or lumen, of the hollow fiber. In addition, by using a bore fluid and an immersion bath, both having a high affinity for the non-sulfonating acid PEEK solvent, a skin will result in both the bore and the outer surface of the PEEK hollow fiber membrane. The surface and internal properties of a fiber of PEEK extruded without a lumen may be similarly modified from the outer surface.

The viscosity of the solution of PEEK in acid solvent at which PEEK hollow fiber membranes advantageously may be prepared will be empirically established by the practitioner having ordinary skill in the art and a working knowledge of the hollow fiber membrane spinning extruder and related machinery employed. Working viscosities are generally in the range from 2 centipoise to 12 centipoise.

A further notable feature of the present invention is that the flux of the PEEK membranes formed according to the instant invention may be enhanced by the incorporation of an effective amount of a halogenated hydrocarbon having three or fewer carbon atoms in the non-sulfonating acid solvent of the membrane casting solution.

A suitable halogenated hydrocarbon for addition to the non-sulfonating acid PEEK solvent must be miscible with the membrane casting solution of dissolved PEEK in a non-sulfonating acid and not cause precipitation of PEEK from the solution. The halogenated hydrocarbon chosen should be immiscible with the coagulation fluid. The halogenated hydrocarbon chosen should be relatively volatile at room temperature or such other temperature at which the membrane preparation process is undertaken. Suitable halogenated hydrocarbons include, but are not limited to, chloroform, methylene chloride, carbon tetrachloride, 1,1,2-trichloroethane, or tetrachloroethane. The foregoing list of solvents is not intended to be exhaustive of all compounds included within the scope of the invention, or to be exclusive of other halogenated hydrocarbons possessing the characteristics necessary and described. While highly satisfactory and usable film fiber and hollow fibers are made using the non-sulfonating acid or non-sulfonating mixture of acids, the enhanced flux referred to is noticeable when the membrane casting solution contains the halogenated hydrocarbon at a concentration up to 20 percent by weight, a range from about 2 to about 15 percent by weight is preferred, most preferably in a range from about 4 to about 10 percent by weight.

A further feature of the present invention is that PEEK membranes prepared according to this invention are also useful as support in composite reverse osmosis membranes made up of thin-layer polymers, or coacervates, or ionic complexes. Typical of such composite membranes are those which may be prepared from interfacial condensation of polyfunctional secondary amines with polyfunctional acid halides as more fully disclosed in U.S. Pat. No. 4,259,183, which is incorporated herein by reference and composite membranes prepared from crosslinked, interfacially polymerized aromatic polyamides as more fully described in U.S. Pat. No. 4,277,344, which is incorporated herein by reference. Composite reverse osmosis membranes may also be prepared according to most any other procedures known and practiced in the art of separation of fluid fractions by reverse osmosis membranes utilizing the PEEK membranes formed according to the present invention as a support for composite membranes.

The invention described herein is intended to be illustrated, but not limited, by the following examples and comparisons.

EXAMPLE 1

4.0 Grams (g) of Victrex PEEK grade 450P, a product of Imperial Chemical Industries, Wilmington, Del. 19897, is weighed into a 50 ml single-neck ground glass round bottom flask. 17.6 Grams of methane sulfonic acid and 11.7 g of trifluoromethane sulfonic acid are added consecutively. The neck of the flask is connected with a ground glass bearing and a ground glass stir rod having a polytetrafluoroethylene blade. The mixture is stirred at approximately 30 to 60 rpm until a dark maroon solution results. Stirring time is approximately 12 hours at room temperature.

A sheet of non-woven polyester fabric to be used as a membrane support is taped to a glass plate. A puddle of dissolved PEEK solution is poured onto the backing and spread across the non-woven fabric with a doctor blade shimmed to provide a gap of 0.152 mm above the glass plate. The glass plate is then immediately immersed in a water bath at room temperature for 30 minutes. A pink colored coagulated membrane results.

Residual acid is removed from the membrane by soaking in 10 percent by weight sodium carbonate for 3 to 10 minutes followed by soaking in methanol for 3 to 10 minutes followed by a final rinsing with water. The membrane appears white in color and opaque to light transmission.

EXAMPLE 2

A series of membranes are prepared in the manner described in Example 1, except that various non-sulfonating acids are used as indicated. The membranes are tested to determine the flux and rejection of a solution of 0.1 percent dextran in water at a pressure of 345 kPa, said dextran having a molecular weight of from about 35,000 to about 50,000. The flux rates for various PEEK loadings and acid solvent systems appear in Table I.

TABLE I

Ultrafiltration Properties of PEEK Membranes Prepared According to Example 1 (Feed: 0.1 percent 35–50K Dextran at 345 kPA)

| Sample | Solvent System | Percent PEEK in Casting Solution | Flux l/ $m^2 \cdot$ day | Percent Dextran Rejection |
|---|---|---|---|---|
| 2.1 | 60% MSA/40% TFMSA | 10 | 1015 | 10.5 |
| 2.2 | 60% MSA/40% TFMSA | 12 | 774 | 41.1 |
| 2.3 | 60% MSA/40% TFMSA | 15 | 600 | 94.7 |
| 2.4 | 60% MSA/40% TFMSA | 16 | 812 | 85.9 |
| 2.5 | 40% MSA/20% TFMSA/40% $H_2SO_4$ | 9 | 5964 | 13.0 |
| 2.6 | 100% TFMSA | 20 | 1104 | 38.7 |

EXAMPLE 3

Membranes prepared according to the method of Example 1 are cast from a solution of 12 percent by weight PEEK in a solvent of a blend of 60 percent MSA/40 percent TFMSA. After the water rinse, the membranes are maintained in a wet condition until used as supports for thin film composite membranes.

Sheet membrane samples are immersed in an aqueous solution of 2 percent m-phenylenediamine for about one minute. After removal of the PEEK membrane supports from the amine bath, they are placed on a glass plate with the side up of the PEEK membrane that was exposed to air at the time of casting and coagulation. Excess amine solution is gently squeezed from the PEEK-type membrane supports by gently rolling with a rubber roller. The PEEK-type supports are then placed flat in a solution of 0.1 weight/volume percent trimesoyl chloride in 1,1,2-trichlorotrifluoroethane for one minute, excess trimesoyl chloride solution is then drained from the resulting membrane. The resulting membranes are then air-dried at room temperature for at least two hours prior to testing for salt rejection at a working pressure of 1,380 kPa. Membranes prepared are tested for salt rejection using a solution of 0.2 percent NaCl at a working pressure of 1,380 kPa. Table II shows salt rejection.

TABLE II

| Samples | PEEK Molecular Weight | Flux (l/$m^2 \cdot$ day) | Percent NaCl Rejection |
|---|---|---|---|
| 3.1[1] | 18,000 | 159 | 90.7 |
| 3.2[2] | 7,000 | 423 | 88.7 |
| 3.3[2] | 13,000 | 445 | 84.8 |

TABLE II-continued

| Samples | PEEK Molecular Weight | Flux (l/m² · day) | Percent NaCl Rejection |
|---|---|---|---|
| 3.4[2] | 18,000 | 476 | 87.6 |

[1]Average of 2 test coupons, cast without non-woven polyester fiber backing.
[2]Average of 3 test coupons, cast on support of non-woven polyester fiber.

EXAMPLE 4

PEEK membranes are cast in the method of Example 3 from a solution of PEEK-type polymer 12 percent by weight, dissolved in a solvent of 60 percent MSA/40 TFMSA. In the method of Example 3, the solution of m-phenylenediamine is replaced with an aqueous solution of 2 percent by weight piperazine, 2 percent by weight triethylamine and 0.2 percent by weight sodium lauryl sulfate. The membranes are tested for magnesium sulfate rejection using an aqueous solution of 0.2 weight percent solution of magnesium sulfate at an operating pressure of 1,380 kPa. Table III shows magnesium sulfate rejection.

TABLE III

| Samples | PEEK Molecular Weight | Flux (l/m² · Day) | Percent MgSO₄ Rejection |
|---|---|---|---|
| 4.1[1] | 18,000 | 476 | 91.4 |
| 4.2[2] | 7,000 | 810 | 82.8 |
| 4.3[2] | 13,000 | 851 | 96.5 |
| 4.4[2] | 18,000 | 794 | 71.2 |

[1]Cast without backing support of non-woven polyester fiber.
[2]Cast on backing support of non-woven polyster fiber.

EXAMPLE 5

0.51 Gram of PEEK crumbs available from Imperial Chemical Industries, under the registered trademark Victrex® PEEK 450P having an average molecular weight of 18,000 are mixed with 10.6 g of methane sulfonic acid in a 30 ml glass bottle. The mixture is stirred on a stirring plate at room temperature for 72 hours to form a clear homogeneous solution. The clear solution is cast on a glass plate and drawn to film membrane of a uniform thickness of 0.51 mm using a casting bar. After 15 seconds, the glass plate is carefully immersed into a 21° C. water bath at an angle of 30° with the horizontal to coagulate the cast solution.

The coagulated membrane sample is white and opaque. The coagulated PEEK sample lifts cleanly from the glass plate. The membrane is subsequently washed in water for 16 hours and air dried. The surface of the PEEK membrane exposed to the air at the time of casting appears to be shiny, while the surface of the membrane in contact with the glass support is dull in appearance. Scanning electron microscope examination discloses submicron pores dispersed uniformly in the textured surface of the matrix having a pore size of about 0.2 μm or less. The glass-contacting surface, however, exhibits larger pore diameters on the order of 3 μm or larger. The membrane is remarkably asymmetric.

A water transmission rate of 10,824 l/m²/day at one atmosphere pressure is observed. The membrane retains a polystyrene latex having a particle size of 0.091 μm.

EXAMPLE 6

Samples of membranes prepared as described in Example 5 are cut and immersed in dimethylformamide for 21 days. Additional samples of membrane prepared as described in Example 5 are out and immersed in dimethylacetamide for 21 days. Examination of the membrane samples after removal from the solvents discloses the membranes have retained their original integrity and remain undissolved and unsoftened in the respective organic solvents. The lack of solubility or softening suggests that the membranes are not sulfonated by the acid mixture solvent in the membrane casting process.

EXAMPLE 7

1.54 Grams of crumbs formed of PEEK having an average molecular weight of 39,200 are mixed with 20.62 g of methane sulfonic acid in a 30 cc glass bottle. The mixture is stirred on a stirring plate at room temperature for 72 hours to form a clear homogeneous solution. The solution is cast on a non-woven polyester fiber substrate of a thickness of 0.097 mm using a casting bar with a 0.254 mm clearance. The substrate with the cast solution thereon is immediately immersed in clear water maintained at 14° C. to coagulate the membrane. The membrane is washed in running water for 30 minutes and air dried. The surface of the membrane is shiny and smooth. The flux rate and size retention characteristics of the membrane are tested with a water solution of 17 weight percent polyvinylpyrrolidone (PVP) having an average molecular weight of 40,000. The membrane exhibits an ultrafiltration flow rate of 146 liters/m²·day at a pressure of 345 kPa. The membrane retains 90 percent of the PVP.

EXAMPLE 8

Four grams of crumbs formed of PEEK having an average molecular weight of 39,200 are mixed with 50 g MSA in a glass bottle. The mixture is stirred for 72 hours to form a clear homogeneous solution. The prepared polymer solution is fed into the barrel of a ram extruder for hollow fiber membrane spinning.

The extruder consists of a 15 mm diameter stainless steel barrel with a single hole spinnerette having a 0.343 mm center hole for a core fluid surrounded by a concentric annularly shaped material flow channel having an inner diameter of about 1.6 mm and having an outer diameter of about 2.1 mm. These dimensions give an extrusion factor (nominal extrudate velocity at the die face, divided by the velocity of the plunger in the barrel) of 120.

The prepared polymer solutions are fed into the barrel at room temperature. The plunger of the extruder moves in the barrel at a constant speed of 51 mm/minute. The PEEK solution emerges through the annular shaped flow channel. A fiber velocity at the die face of about 1.5 m/min results.

The core fluid contains a mixture of 20 percent water and 80 percent polyglycol having an average molecular weight of 1,000. The core fluid stream is empirically adjusted with a needle valve to cause a uniform stream of shaped PEEK solution to develop before the shaped solution enters a water coagulation bath. The extruded hollow fiber exits the spinnerette flowing downward at right angles to the horizontal into a water coagulation bath. A 7.6 cm air gap exists between the spinnerette and the underlying water coagulation bath.

After coagulation, the fiber is wound using a motor driven winder. The winding speed is adjusted to produce a PEEK fiber having a size of 1 mm outside diameter and 500 μm inside diameter. The collected fiber is leached and rinsed in water for from 15 to 60 minutes.

Figure 1:
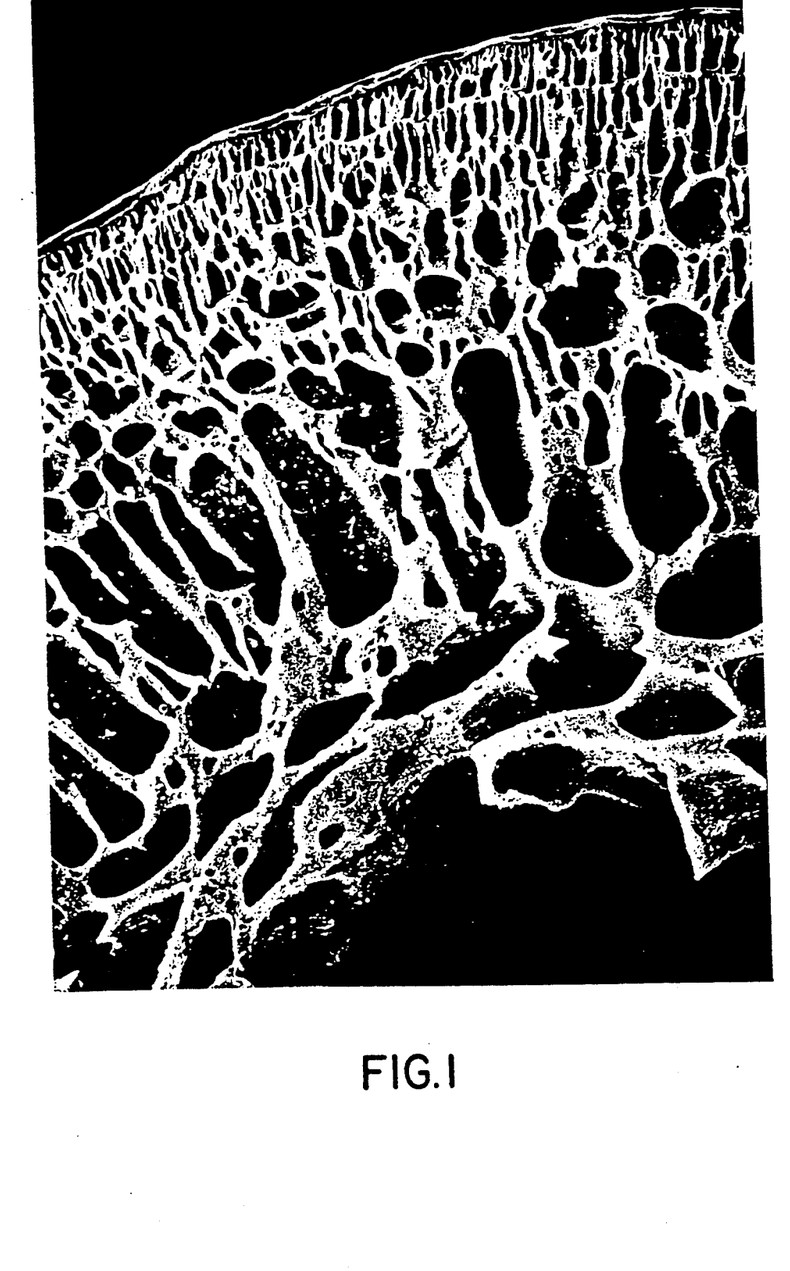
FIG. 1 is a photograph of an image generated by scanning electron microscope of a section of an end-view of the hollow fiber microporous membrane prepared from a PEEK-type polymer in accordance with the invention.

The resulting fibers exhibit an asymmetric microporous structure. A scanning electron microscope photograph of an end-view of a section of a fiber appears as FIG. 1 hereof. Filtration tests disclose a flux of from about 81 to about 244 l/m²·day at 83.4 kPa. Molecular weight cut-off was 360,000 with 80 percent retention.

EXAMPLE 9

A polymer solution is prepared substantially as in Example 8. PEEK hollow fiber membranes are spun using the equipment and method of Example 8, except that the core liquid is water, and the coagulation bath is tetraethylene glycol. The spun fibers remain immersed in the coagulation bath until the fibers turn totally white and opaque, an indication of complete coagulation. Thereafter, the fibers are transferred to a water bath for rinsing.

Figure 2:
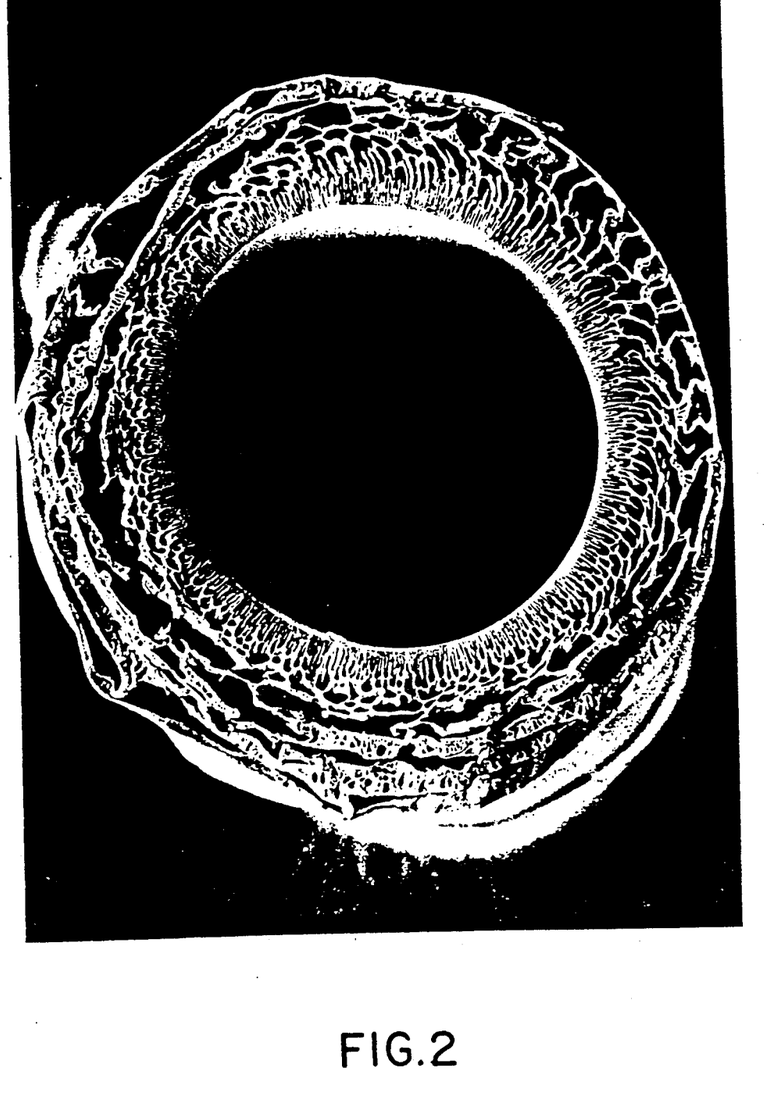
FIG. 2 is a photograph of an image generated by a scanning electron microscope of an end-view of a hollow fiber microporous membrane prepared from a PEEK-type polymer in accordance with the invention.

The fibers prepared in accordance with this example exhibit an asymmetric microporous structure with a skin formation at the lumen surface. A finger-like microporous structure with fingers extending radially from the skin of the lumen toward the outside surface and a layer of sponge-like porous structure with vacuoles therein is exhibited next to the outside surface. A scanning electron microscope photograph of an end-view of a section of the resulting membrane fiber wall appears as FIG. 2. Scanning electron microscope examination reveals the outside surface to be porous having pore sizes in a range from 0.2 μm to 0.5 μm.

EXAMPLE 10

Figure 3:
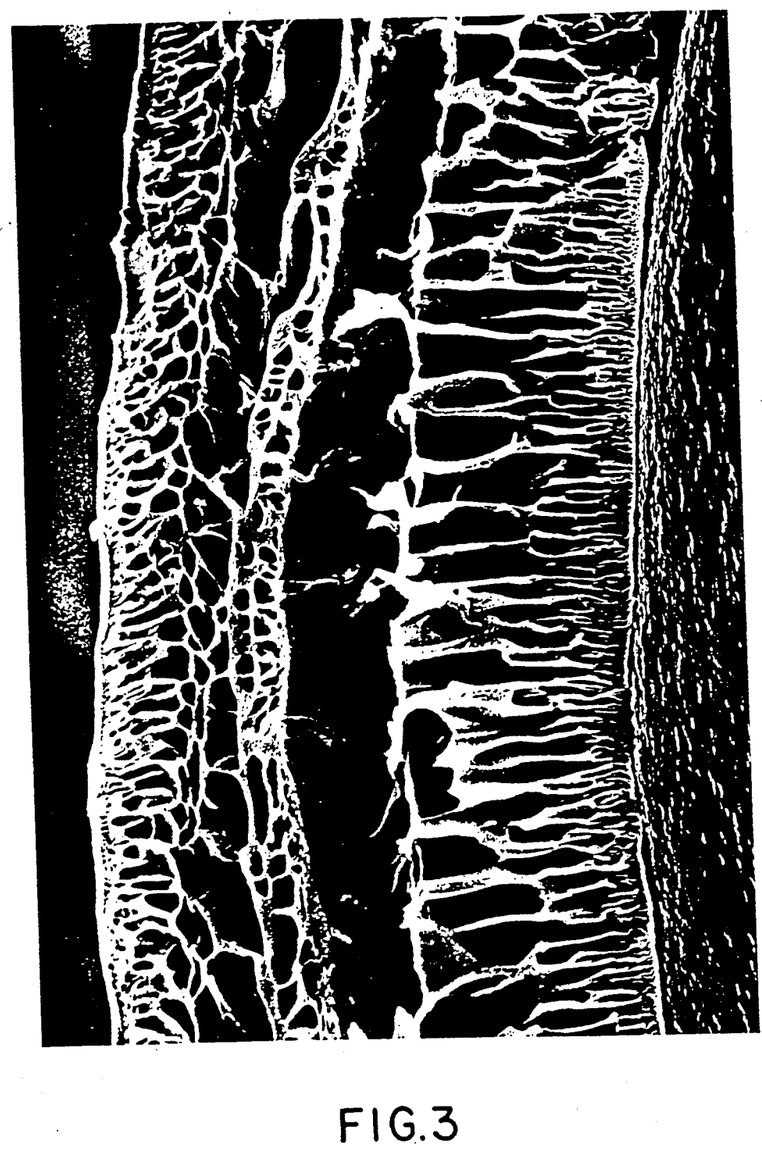
FIG. 3 is a photograph of an image generated by a scanning electron microscope of a section of an end-view of a hollow fiber microporous membrane prepared from a PEEK-type polymer in accordance with the invention.

A polymer solution and membrane spinning methods are employed as in Example 8 to prepare PEEK hollow fiber membranes with the exception that both the core fluid and the coagulation medium are water. Membranes prepared exhibit both an inside and outside skin formation with a finger-like structure extending from the skin across the fiber thickness toward the opposing surface. A scanning electron microscope photograph of the fiber membranes prepared in the practice of this example appears as FIG. 3.

EXAMPLE 11

Four grams of crumbs formed of PEEK having an average molecular weight of 39,200 are mixed with 50 g MSA in a glass bottle, stirring 72 hours to form a clear homogeneous solution. Liquid chloroform in varying amounts is then added to respective portions of PEEK solution according to the schedule of Table IV. The mixture is stirred for at least one additional hour. Membranes are cast from the solution on non-woven polyester substrates using a 0.25 mm clearance casting bar. The substrate and PEEK casting solution are then immediately immersed in water maintained at 15° to 18° C. for a period of about twenty minutes to coagulate the solution to a membrane. The membranes are washed in running water for 1 hour and air dried. Flow rate and molecular size retention are tested using an Amicon Model 8050 filtration cell having a size of 50 ml. A 0.5 percent polyvinylpyrrolidone solution in water having a molecular weight of 40,000 is used to measure size retention. The permeate concentrations are determined by ultraviolet spectroscopy.

Table IV shows membrane flux and PVP retention for chloroform loading.

Membranes cast from solutions having 5 percent chloroform show a dramatic water flux improvement with no significant change in molecular weight cut-off.

TABLE IV

| Sample | Additional Percent CHCl₃ | Flux l/m²·day at 345 kPa | Retention PVP 40,000 (percent) |
|---|---|---|---|
| 11.1 | 0 | 50 | >95 |
| 11.2 | 5 | 794 | >90 |
| 11.3 | 10 | 186 | >90 |

EXAMPLE 12

Membrane solutions are prepared in accordance with Example 11 except a mixture of acids are used as solvent. MSA and TFMSA in a ratio of 90 percent MSA/10 percent TFMSA are used as solvents at room temperature. After PEEK is dissolved in the manner of Example 11, 5 percent chloroform is added to an aliquot and the solution stirred for an additional hour. The PEEK concentrations in the membrane casting solutions utilized and the results of testing the membranes are disclosed in Table V, the membranes cast being evaluated for flux and molecular size retention.

TABLE V

| Sample | PEEK Loading Percent | CHCl₃ | Flux as l/m²·day at 345 kPa | Retention PVP, 40,000 (percent) |
|---|---|---|---|---|
| 12.1 | 10 | 0 | 16 | >95 |
| 12.2 | 10 | 5 percent | 615 | 95 |
| 12.3 | 12 | 0 | 15 | >95 |
| 12.4 | 12 | 5 percent | 30 | 95 |
| 12.5 | 15 | 0 | 9 | >95 |
| 12.6 | 15 | 5 percent | 46 | >95 |

What is claimed is:

1. A method of forming an article of a PEEK polymer whereby a PEEK polymer is dissolved in a non-sulfonating acid solvent, the PEEK polymer solution is cast into the shape of the article, the article is coagulated in a coagulation bath which is a non-solvent for a PEEK polymer, but which is miscible with the non-sulfonating acid solvent, thereby leaching the non-sulfonating acid solvent from the membrane.

2. The method of forming a semi-permeable microporous membrane of a PEEK polymer comprising dissolving a PEEK polymer in a non-sulfonating acid, or a non-sulfonating mixture of acids, and casting the solution of a PEEK polymer to form a microporous membrane of a PEEK polymer, coagulating the cast solution of a PEEK polymer in a coagulation bath which is a non-solvent for a PEEK polymer, but which is miscible with the non-sulfonating acid solvent, thereby leaching the non-sulfonating acid solvent from the membrane.

3. The method as in claim 2 wherein the non-sulfonating acid solvent contains methane sulfonic acid or trifluoromethane sulfonic acid, or a mixture thereof.

4. The method as in claim 2 wherein the solution of dissolved PEEK polymer is cast upon a supporting substrate.

5. The method as in claim 4 wherein the supporting substrate is formed from woven or non-woven fibers of glass, polyester, natural fiber, or polyethersulfone.

6. The method as in claim 2 wherein the non-sulfonating acid solvent contains an effective amount of a halogenated hydrocarbon having three or less carbon atoms to enhance the flux of the resulting membrane.

7. The method as in claim 2 wherein the non-sulfonating acid solvent contains up to 60 percent sulfuric acid.

8. The method as in claim 2 wherein the coagulation bath has a high relative rate of diffusion into the polymer phase.

9. The method as in claim 2 wherein the coagulation bath has a low relative rate of diffusion into the polymer phase.

10. The method as in claim 2 wherein the non-sulfonating acid solvent contains at least one acid selected from the group consisting of trichloromethane sulfonic acid, hydrofluoric acid, and phosphoric acid.

11. A method of forming a fiber of a PEEK polymer comprising dissolving a PEEK polymer in a non-sulfonating acid, extruding the solution of a PEEK polymer through an orifice to form a fiber, and immersing the fiber in a coagulation bath.

12. A method of forming a hollow fiber of a PEEK polymer comprising dissolving a PEEK polymer in a non-sulfonating acid, extruding the PEEK polymer solution through an annular shaped orifice, injecting at the orifice a core fluid in the lumen of the fiber thus formed, and immersing the fiber in a coagulation bath.

13. The method of forming a hollow fiber of a PEEK polymer as in claim 12 wherein the solvent is a mixture of a non-sulfonating acid and up to 60 percent $H_2SO_4$.

14. The method as in claim 12 wherein the non-sulfonating acid or mixture of acids contains methane sulfonic acid, or trifluoromethane sulfonic acid, or a mixture thereof.

15. The method as in claim 12 wherein the core fluid has a high affinity for the non-sulfonating acid PEEK solvent.

16. The method as in claim 12 wherein the core fluid has a low affinity for the non-sulfonating acid solvent.

17. The method as in claim 12 wherein the coagulation bath has a high affinity for the non-sulfonating acid PEEK polymer solvent.

18. The method as in claim 12 wherein the coagulation bath has a low affinity for the non-sulfonating acid PEEK polymer solvent.

19. The method as in claim 12 wherein the non-sulfonating acid contains a halogenated hydrocarbon having three or less carbon atoms effective to enhance the flux of the resulting hollow fiber membrane.

20. The method as in claim 9 wherein the coagulation bath contains a non-sulfonating acid, or a non-sulfonating amount of a sulfonating acid.

21. An article of a PEEK polymer prepared by the method of claim 1.

22. A microporous membrane comprising PEEK having a pore size from about 1.0 μm to 3 μm.

23. A microporous membrane of a PEEK polymer comprising an asymmetric structure of PEEK between membrane surfaces.

24. A hollow fiber of a PEEK polymer prepared by the method of claim 12.

25. A fiber of PEEK polymer prepared by the method of claim 11.

26. A hollow fiber comprising a PEEK polymer.

27. A microporous membrane comprising a hollow fiber of PEEK polymer having an asymmetric structure of PEEK between the lumen surface and the outer fiber wall.

28. A composite membrane comprising a substrate layer of a porous PEEK polymer and a selective layer of an interfacial condensation of permselective polymer.

29. A composite membrane comprising a substrate layer of a porous PEEK polymer and a selective layer of coacervate forming compounds.

30. The microporous PEEK polymer membrane as in any one of claims 22, 23, and 27 wherein the membrane is used as a support substrate for interfacial condensation of coacervate forming compounds which compounds are subsequently chemically crosslinked.

31. The microporous membrane as in claim 27 having a pore size from about 0.1 μm to about 3 μm.

32. A microporous hollow fiber membrane comprising PEEK having a pore size from 1.0 μm to 3.0 μm.

* * * * *